US011390349B2

(12) United States Patent
Dorresteyn et al.

(10) Patent No.: US 11,390,349 B2
(45) Date of Patent: Jul. 19, 2022

(54) ELECTRIC MOTORCYCLE WITH MONOCOQUE HOUSING BATTERIES

(71) Applicant: Damon Motors Inc., Vancouver (CA)

(72) Inventors: Derek Dorresteyn, Mill Valley, CA (US); Jeff Waldo Sand, San Francisco, CA (US); Damon Jay Giraud, North Vancouver (CA); Dominique Kwong, Coquitlam (CA)

(73) Assignee: Damon Motors Inc., Vancouver (CA)

( * ) Notice: Subject to any disclaimer, the term of this patent is extended or adjusted under 35 U.S.C. 154(b) by 147 days.

(21) Appl. No.: 16/936,306

(22) Filed: Jul. 22, 2020

(65) Prior Publication Data

US 2021/0276655 A1 Sep. 9, 2021

Related U.S. Application Data

(60) Provisional application No. 63/033,958, filed on Jun. 3, 2020, provisional application No. 63/014,478, filed
(Continued)

(51) Int. Cl.

| | |
|---|---|
| *B62K 25/28* | (2006.01) |
| *B62J 43/28* | (2020.01) |
| *B62K 11/02* | (2006.01) |
| *B62J 43/16* | (2020.01) |
| *B62K 11/04* | (2006.01) |
| *B62K 19/40* | (2006.01) |

(Continued)

(52) U.S. Cl.
CPC .............. *B62K 11/04* (2013.01); *B62J 43/28* (2020.02); *B62K 11/02* (2013.01); *B62K 19/12* (2013.01);
(Continued)

(58) Field of Classification Search
CPC .................................. B62J 43/16; B62J 43/28
(Continued)

(56) References Cited

U.S. PATENT DOCUMENTS

| | | | | | |
|---|---|---|---|---|---|
| 1,479,738 | A | * | 1/1924 | Pullin ..................... | B62K 19/02 |
| | | | | | 180/227 |
| 6,047,786 | A | * | 4/2000 | Stevenson ............... | B60L 50/66 |
| | | | | | 180/68.5 |

(Continued)

FOREIGN PATENT DOCUMENTS

| | | | | | |
|---|---|---|---|---|---|
| CN | 111994195 | A | * | 11/2020 | ............. B62K 11/02 |
| WO | 20190096680 | | | 5/2019 | |

(Continued)

OTHER PUBLICATIONS

Patent Cooperation Treaty International Search Report dated May 26, 2021 issued for the copending application assigned International Application No. PCT/CA2021/050224 with an International Filing Date of Feb. 25, 2021.

(Continued)

*Primary Examiner* — Jacob B Meyer
*Assistant Examiner* — Hosam Shabara
(74) *Attorney, Agent, or Firm* — Damien G. Loveland

(57) ABSTRACT

A core of the electric motorcycle includes a monocoque that partially encloses a housing for a motor and gearbox. Separate suspension mounts attach to the core, which permits them to be exchanged for other mounts to provide different suspension geometries. A power electronics unit attaches to the front of the monocoque. The shape of the monocoque allows for the proper positioning of the center of gravity of the motorcycle in order to provide a balanced ride.

18 Claims, 3 Drawing Sheets

Related U.S. Application Data on Apr. 23, 2020, provisional application No. 62/985,279, filed on Mar. 4, 2020.

(51) Int. Cl.
*B62K 19/24* (2006.01)
*B62K 19/12* (2006.01)

(52) U.S. Cl.
CPC .............. *B62K 19/24* (2013.01); *B62K 19/40* (2013.01); *B62K 25/283* (2013.01); *B62K 25/286* (2013.01); *B62J 43/16* (2020.02); *B62K 2204/00* (2013.01)

(58) Field of Classification Search
USPC ........................................................ 180/220
See application file for complete search history.

(56) References Cited

U.S. PATENT DOCUMENTS

| | | | |
|---|---|---|---|
| 7,255,191 B2 * | 8/2007 | Baldwin | B62K 11/10 180/312 |
| 8,316,976 B2 * | 11/2012 | Johnson | B60L 50/66 180/68.5 |
| 2006/0000655 A1 | 1/2006 | Schless | |
| 2010/0133030 A1 | 6/2010 | Johnson et al. | |
| 2011/0036657 A1 * | 2/2011 | Bland | B60L 58/26 180/312 |
| 2011/0042916 A1 * | 2/2011 | Ananthakrishna | B62K 11/10 280/287 |
| 2013/0299265 A1 | 11/2013 | Marazzi | |
| 2016/0039489 A1 * | 2/2016 | Platz | B62K 19/32 180/219 |

FOREIGN PATENT DOCUMENTS

| | | | | |
|---|---|---|---|---|
| WO | 20190170306 | | 9/2019 | |
| WO | WO-2021243457 A1 * | 12/2021 | | B62K 11/02 |

OTHER PUBLICATIONS

Patent Cooperation Treaty Written Opinion of the International Searching Authority dated May 26, 2021 issued for the copending application assigned International Application No. CA2021/050224 with an International Filing Date of Feb. 25, 2021.

* cited by examiner

ELECTRIC MOTORCYCLE WITH MONOCOQUE HOUSING BATTERIES

TECHNICAL FIELD

This application relates to an electric motorcycle. More specifically, it relates to an electric motorcycle with a monocoque chassis.

BACKGROUND

Motorcycles are usually built with a frame construction, which may be costly, unduly complex or heavier than desired. The steering head is connected to the upper front part of the frame in a traditional motorcycle, and the swingarm is connected to the lower, rear portion of the frame. A conventional frame can be defined as a structure that spans between a headstock, swingarm and motor bosses. In some electric motorcycles, the battery and the motor are mechanically connected in a unit that has integral suspension bosses, which is used in lieu of the frame. Some motorcycles have been made with a monocoque chassis, for example using sheet aluminum of 1.5 mm thickness. Other electric motorcycles use a frame and a clamshell pack for holding the batteries.

SUMMARY OF INVENTION

The present invention is directed to an electric motorcycle with a monocoque structure, which houses the battery pack that powers the motor of the motorcycle. The electric motorcycle chassis is simplified by using the housing for the battery pack and the housing for the motor and gears as structural elements. The battery pack housing is stressed, as it bears loads required to maintain integrity and rigidity of the motorcycle.

Depending on the embodiment, the present invention provides one or more of the advantages of reduced mass, reduced cost and reduced complexity compared to electric motorcycles with frames. Further possible advantages include improved balance, and allowing fundamental changes in suspension geometries or changes in components without needing to change major parts such as the battery housing or the motorcycle frame.

Disclosed herein is a core for an electric motorcycle comprising: a monocoque that defines a mouth, the monocoque dimensioned to enclose a battery pack; a housing for a motor and gear, the housing connected to the monocoque inside the mouth; and fixation points defined in the core for removably attaching one or more suspension mounts.

BRIEF DESCRIPTION OF DRAWINGS

The following drawings illustrate embodiments of the invention, which should not be construed as restricting the scope of the invention in any way.

DESCRIPTION

A. Exemplary Embodiments

Figure 1:
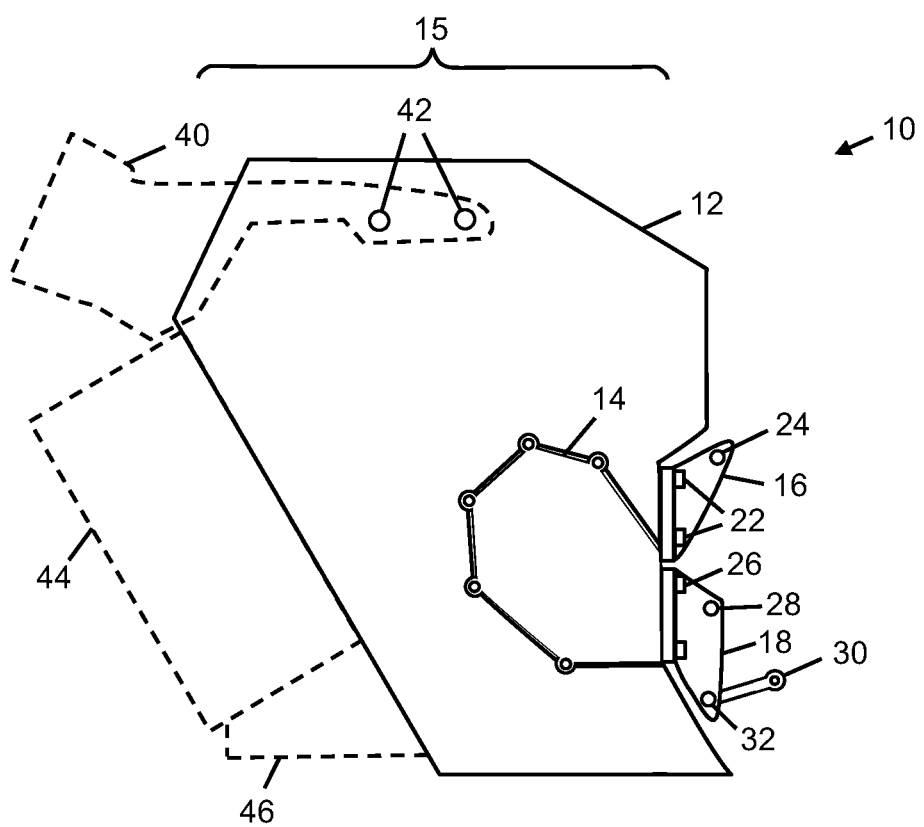
FIG. 1 is a schematic side view of the central components of an electric motorcycle, in accordance with an embodiment of the present invention.

Referring to FIG. 1, there is shown an assembly 10 of the central components of an electric motorcycle. The assembly 10 includes a monocoque 12 and housing 14 for the motor and gears (gearbox). The monocoque 12 and motor and gear housing 14 together form the core 15 of the electric motorcycle. The monocoque 12 is the housing for the battery pack that powers the motor, and also provides the structural rigidity for the electric motorcycle. The motor and gear housing 14 is screwed or otherwise attached to the monocoque 12, and is removable from it in the event that repair or replacement is desired.

Included at the rear of the assembly 10 of the central components of the electric motorcycle are a shock absorber mount 16 and a swingarm mount 18. Collectively, the shock absorber mount 16 and a swingarm mount 18 may be referred to as suspension mounts.

The shock absorber mount 16 is connected by screws 22 to the core 15. In this embodiment, the shock absorber mount 16 is connected by screws 22 to the monocoque. In some embodiments, the shock absorber mount 16 is connected by screws to both the monocoque 12 and the motor and gear housing 14. In other embodiments, the shock absorber mount 16 is connected to only the motor and gear housing 14. In the example of the shock absorber mount 16 shown, hole 24 is shown for attaching the top of a shock absorber.

The swingarm mount 18 is connected by screws 26 to the core 15. In this embodiment, the swingarm mount 18 is connected by bolts 26 to the motor and gear housing 14. In some embodiments, the swingarm mount 18 is connected by screws to both the monocoque 12 and the motor and gear housing 14. In other embodiments, the swingarm mount 18 is connected to only the monocoque 12. In the example of the swingarm mount 18 shown, hole 28 is shown for attaching the swingarm, and shock absorber link 30 is shown for direct or indirect attachment to the lower end of the shock absorber and indirectly to the swingarm. The shock absorber link 30, which may allow for progressive suspension to be used, pivots about point 32.

By making the suspension mounts 16, 18 detachable from the monocoque 12, the core 15 can be adapted to different suspension geometries and different suspension components. For example, one or both of the suspension mounts 16, 18 may be removed and replaced with another with a different geometry, without the need for replacing or modifying the monocoque 12. The flexibility of changing the suspension geometry allows for different performance requirements to be satisfied using the same core 15.

The monocoque 12 may be referred to as a torsion box, in which the majority of the loads it is subjected to are borne by the skin of its structure. The material from which the monocoque 12 is made is chosen for structural, performance, cost, and manufacturing reasons. Materials such as die cast aluminum or magnesium, gravity cast aluminum, and sand cast aluminum are possible materials that may be selected for the monocoque 12. Machined billet aluminum, forged aluminum, and formed aluminum, and formed and welded aluminum are also possibilities.

The monocoque 12 includes fixation points for connecting the motor and gear housing 14. Depending on the geometry, the motor and gear housing 14 is removable from only one side of the monocoque 12. The monocoque 12 also includes fixation points such as tapped holes for attaching a headstock 40 using, for example, screws 42. A power electronics unit 44 is also connected to the monocoque 12. Housing 46 is also connected to the monocoque 12, and it may be for the AC charger. Housing 46 may or may not be a separate housing from the power electronics unit 44. If separate, the benefit would be a more easily serviced unit.

The battery pack inside the monocoque 12 may be one large pack, i.e. a single module, or multiple smaller battery packs or modules. The cells inside the battery pack may be arranged in any suitable orientation. The monocoque 12 may include a grounding connection for an isolation monitoring circuit that continuously monitors that the battery pack's high voltage circuit is electrically isolated form the monocoque to help ensure safety from electric shock. If an isolation fault is detected the motorcycle will become inoperable and will not allow charging, by opening the main contactors and not allowing them to be energized or closed again until the fault is cleared.

Also, included in the core 15 may be mounting points, for example cast features and tapped holes, to accommodate the mounting of auxiliary systems such as radiators, fairings, headlight, tail section, pump and body panels, brackets, electronics units, sensors, footpegs, guards and optional components, etc. These additional mounting points may be in or on the monocoque 12, the motor and gear housing 14, or both.

Figure 2:
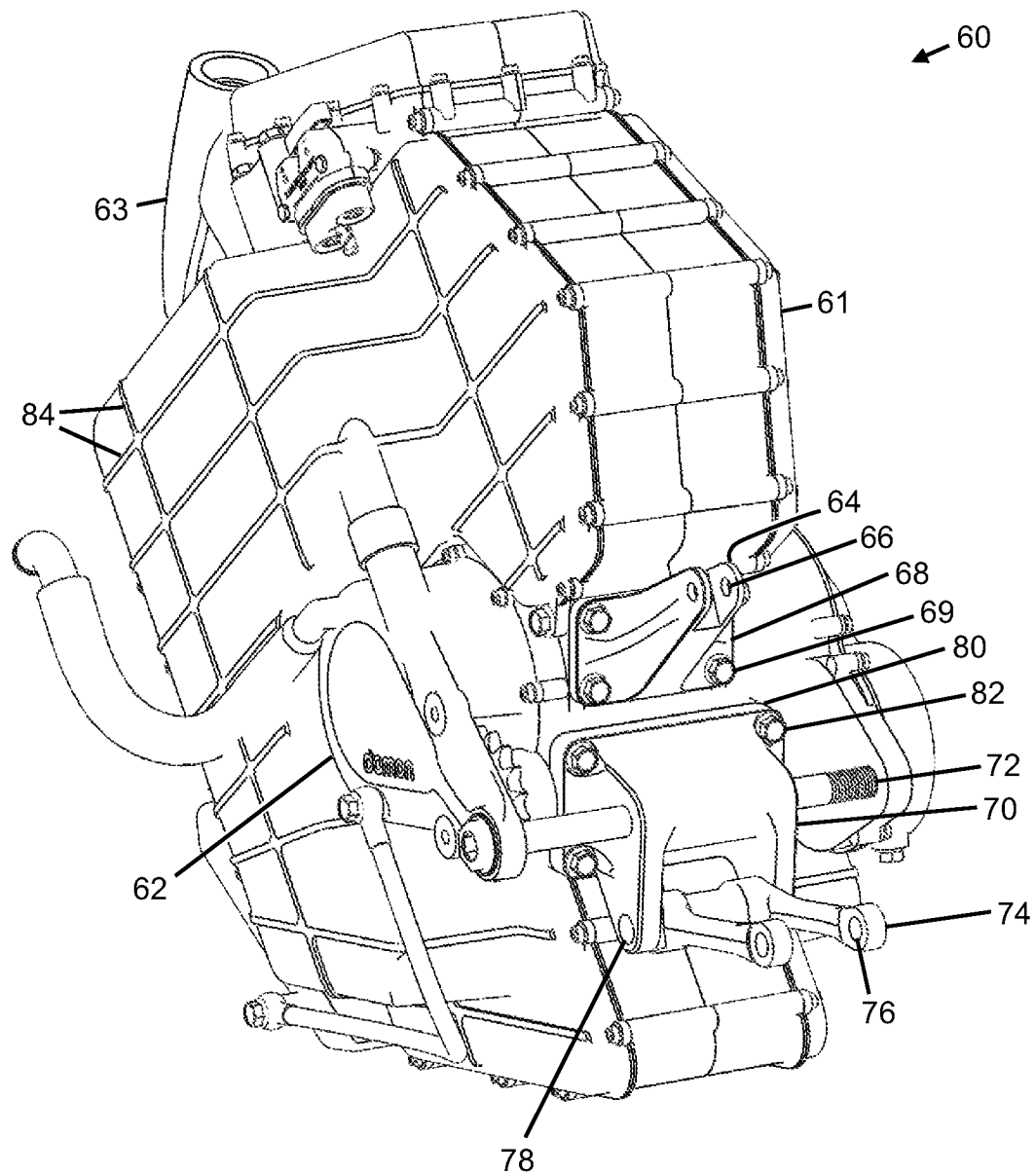
FIG. 2 is a perspective view of the central components of an electric motorcycle, in accordance with another embodiment of the present invention.

FIG. 2 is another assembly 60 of the central components of an electric motorcycle, including a monocoque 61 that houses a battery pack, a motor and gear housing 62, and a headstock 63. Attached to the monocoque 61 and the motor and gear housing 62 is a shock absorber mount 64 with mounting holes 66 for a shock absorber. The shock absorber mount 64 is attached via its baseplate 68 with screws 69. Also attached to the core, which includes the monocoque 61 and motor and gear housing 62, is a swingarm mount 70, in which a swingarm mounting bolt 72 is shown. A shock absorber link 74 with mounting hole 76 is shown as part of the swingarm mount 70, attached at pivot point 78. The swingarm mount 70 is attached to the motor and gear housing 62 via its baseplate 80 using screws 82.

The shell of the monocoque 61 has channels or ribs 84 in a form that is compatible with the material and manufacturing process of the monocoque in relation to the structural needs of the motorcycle. The monocoque 61 may be made as two clamshells attached together. Alternately, the monocoque 61 may have two side plates that are connected to a central wall. The side plates of the monocoque 61, when attached, provide significant structural strength to the motorcycle and carry a large part of the structural load. The central wall of the monocoque 61 does not need to be strong enough alone to support the static motorcycle but it could. However, if it is not strong enough, then removal of both of the side plates at the same time should be prevented for safety reasons if the motorcycle is otherwise completely assembled.

Side plates that bolt onto central structure formed allow assembly or maintenance of the battery pack, after removal of one or both of the side plates. In the two-clamshell arrangement of the monocoque, one of the clamshells may be removed to provide access to the battery pack for maintenance or exchange.

The monocoque 61 may be closed with the use of tamper-proof screws, or other security measures may be employed to close the monocoque.

Figure 3:
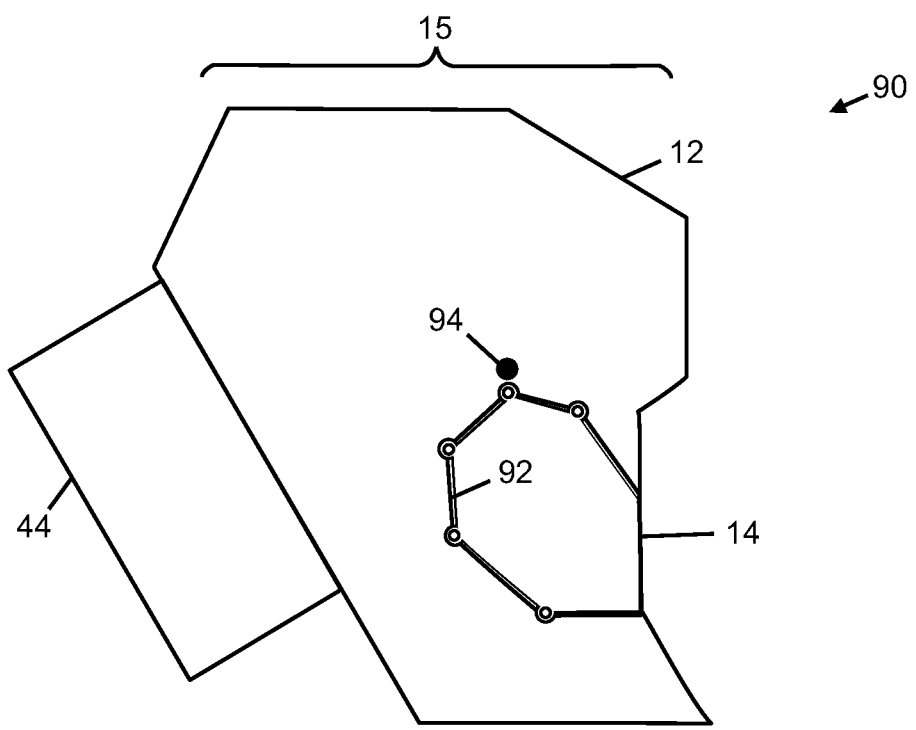
FIG. 3 is a schematic side view of the power electronic unit, the battery pack housing and the motor and gear housing of an electric motorcycle, in accordance with an embodiment of the present invention.

FIG. 3 is a central assembly 90 for an electric motorcycle without the suspension mounts 16, 18. The central assembly 90 includes the core 15 and the power electronic unit 44. The core 15 includes the monocoque 12 and motor and gear housing 14, Notably, the monocoque 12 is C-shaped, with the motor and gear housing 14 being positioned in the mouth 92 of the C. The batteries therefore surround the motor and gear housing 14 on three sides, i.e. the top, front and bottom. The monocoque covers at least majority of a front, a majority of a top, and a majority of a bottom of the housing 14 for the motor and gear.

The power electronics unit 44, which has a lower density then the battery pack, is located forward of the monocoque 12. This arrangement of the monocoque 12, the motor and gear housing 14 and the power electronics unit 44 allows the position 94 of the center of gravity of the assembly 90 to be located for correct balance of the motorcycle. That is, the position 94 of the center of gravity between the wheels of the motorcycle is correctly located both horizontally and vertically.

If the shape of the monocoque 12 did not have such a pronounced concave portion forming the mouth of the C, then it would not be possible to locate the center of gravity correctly, while keeping the same size of battery pack. For example, if the battery pack and motor and gear housing were aligned linearly (i.e. side by side as blocks), then the resulting motorcycle would likely not handle well at elevated speeds due to an improper location of the center of gravity. Furthermore, the arrangement of the central assembly 90 is such that it keeps the volume of the batteries out of the way of the rider.

Figure 4:
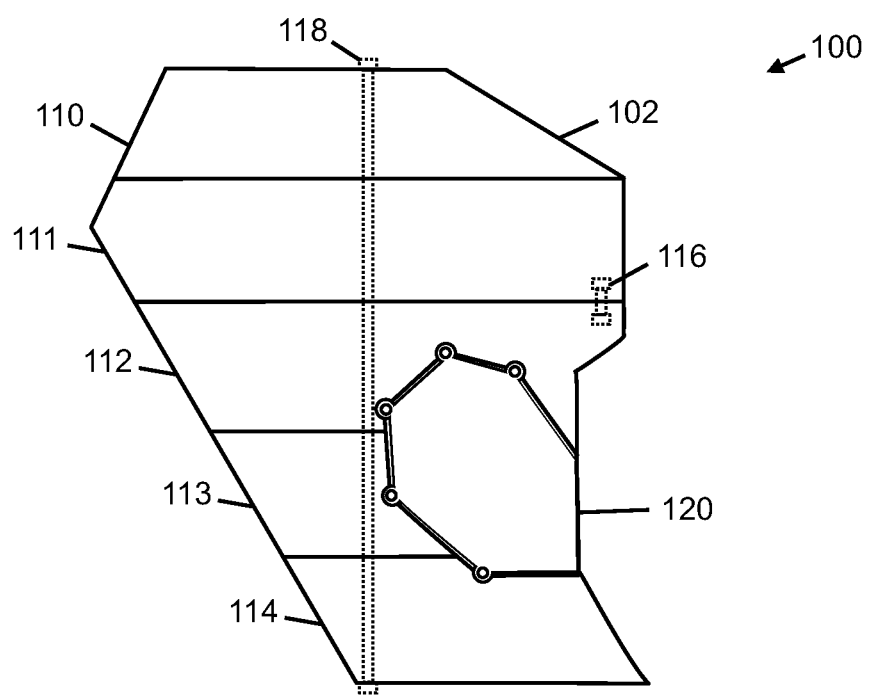
FIG. 4 is a schematic side view of an alternate monocoque structure for an electric motorcycle, in accordance with an embodiment of the present invention.

FIG. 4 is another example of a core 100, in which the monocoque 102 is made from a series of layers or cases 110, 111, 112, 113, 114 that are bolted together. The bolts may be bolts (e.g. 116) that join only adjacent layers, or cases. Alternately, the bolts may be long bolts (e.g. 118) that pass through more than two or even all of the stacked layers, or cases. This would be structurally superior as longer bolts can more easily retain joint tension compared to shorter bolts. The bolts may be positioned or angled differently to the examples shown, and there may be a combination of the two different types of bolt.

The motor and gear housing 120 is attached to several of the layers 112, 113, 114. Each layer 110-114 of the monocoque 102 may house its own battery pack. The layers 11, 112, 113 may be open at the top and bottom, layer 110 may be open at the bottom, and layer 114 may be open at the top. Alternately, all the layers 110-114 may be closed both on the top and the bottom. The resulting stack of the layers 110-114 may therefore support some of the loads. The layers may be fastened together by long bolts that tighten them all together, or by any other suitable means. In some embodiments, the headstock may form a cover or partial cover for the uppermost layer 110.

B. Variations

While specific embodiments for carrying out the subject matter disclosed and claimed herein have been described, other variations are also possible.

For example, the shock absorber mount 16 and the swingarm mount 18 may be combined, and made as a single component that bolts onto the core 15. Bolts inserted into through-holes may be used in some places instead of screws that are inserted into tapped holes. Screws and tapped holes may be used instead of nuts and bolts in some locations.

The battery pack inside the monocoque may be made of modules that stack together, and the resulting stack may support some of the loads. For example, the stack may be a sandwich structure, or the modules may have outer plates that lie in a different plane to the sides of the monocoque.

The shape of the monocoque may be other than C-shaped so long as it defines a mouth or other suitable recess for the motor and gear housing.

Although the present invention has been illustrated principally in relation to two-wheeled motorcycles, it has application in respect of three-wheeled motorcycles and quadricycles.

In general, unless otherwise indicated, singular elements may be in the plural and vice versa with no loss of generality. The term "module" can refer to any component in this invention and to any or all of the features of the invention without limitation. A module may include software, firmware or hardware.

Throughout the description, specific details have been set forth in order to provide a more thorough understanding of the invention. However, the invention may be practiced without these particulars. In other instances, well known elements have not been shown or described in detail and repetitions of features have been omitted to avoid unnecessarily obscuring the invention. Accordingly, the specification and drawings are to be regarded in an illustrative, rather than a restrictive, sense.

It will be clear to one having skill in the art that further variations to the specific details disclosed herein can be made, resulting in other embodiments that are within the scope of the invention disclosed. Modules may be divided into constituent modules or combined into larger modules. All proportions, materials, and configurations described herein are examples only and actual ones of such depend on the specific embodiment. Accordingly, the scope of the invention is to be construed in accordance with the substance defined by the following claims.

The invention claimed is:

1. A core for an electric motorcycle comprising:
   a monocoque having a C-shape that defines a mouth open to a rear of the monocoque, the monocoque dimensioned to enclose a battery pack;
   a power electronics unit attached to a front side of the monocoque;
   a housing for a motor and gear, the housing connected to the monocoque inside the mouth, the monocoque extending around a top, front and bottom of the housing; and
   fixation points defined in the core for removably attaching one or more suspension mounts.

2. The core according to claim 1, further comprising the one or more suspension mounts removably attached to the core.

3. The core according to claim 2, wherein the suspension mounts include a shock absorber mount and a swingarm mount.

4. The core according to claim 2, wherein the suspension mounts include a shock absorber mount and a combined swingarm and shock absorber link mount.

5. The core according to claim 1, wherein the fixation points are in the monocoque.

6. The core according to claim 1, wherein the fixation points are in the housing for the motor and gear.

7. The core according to claim 1, wherein the fixation points are in the monocoque and the housing for the motor and gear.

8. The core according to claim 1, wherein the monocoque comprises two clamshells.

9. The core according to claim 1, wherein the monocoque comprises two side plates and a wall between the side plates.

10. The core according to claim 1, wherein the monocoque covers a majority of a front, a majority of a top, and a majority of a bottom of the housing for the motor and gear.

11. The core according to claim 1, wherein the monocoque comprises multiple layers that are removably connected together.

12. The core according to claim 1, comprising further fixation points for a headstock.

13. The core according to claim 1, comprising further fixation points for one or more accessories.

14. A motorcycle comprising a core, the core comprising:
    a monocoque having a C-shape that defines a mouth open to a rear of the monocoque, the monocoque dimensioned to enclose a battery pack;
    a power electronics unit attached to a front side of the monocoque;
    a housing for a motor and gear, the housing connected to the monocoque inside the mouth, the monocoque extending around a top, front and bottom of the housing; and
    fixation points defined in the core for removably attaching one or more suspension mounts.

15. The motorcycle according to claim 14, wherein the fixation points are in the monocoque.

16. The motorcycle according to claim 14, wherein the fixation points are in the housing for the motor and gear.

17. The motorcycle according to claim 14, wherein the fixation points are in the monocoque and the housing for the motor and gear.

18. The motorcycle according to claim 14, wherein the monocoque covers a majority of a front, a majority of a top, and a majority of a bottom of the housing for the motor and gear.

* * * * *